US010062002B2

(12) United States Patent
Smirnov et al.

(10) Patent No.: US 10,062,002 B2
(45) Date of Patent: Aug. 28, 2018

(54) TECHNOLOGIES FOR DETERMINING LOCAL DIFFERENTIATING COLOR FOR IMAGE FEATURE DETECTORS (71) Applicant: Intel Corporation, Santa Clara, CA (US)

(72) Inventors: Pavel S. Smirnov, Saint Petersburg (RU); Piotr Semenov, Saint Petersburg (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/695,705

(22) Filed: Sep. 5, 2017

(65) Prior Publication Data

US 2018/0150717 A1 May 31, 2018

Related U.S. Application Data (63) Continuation of application No. 14/361,212, filed as application No. PCT/RU2013/001074 on Nov. 28, 2013.

(51) Int. Cl.
*G06K 9/00* (2006.01)
*G06K 9/46* (2006.01)

(52) U.S. Cl.
CPC ......... *G06K 9/4652* (2013.01); *G06K 9/4609* (2013.01); *G06K 9/4671* (2013.01)

(58) Field of Classification Search
CPC .............................................. G06K 9/00–9/82
See application file for complete search history.

(56) References Cited

U.S. PATENT DOCUMENTS

| 7,813,582 | B1* | 10/2010 | Chaudhury | ............. | G06T 5/003 |
| | | | | | 382/167 |
| 7,965,875 | B2* | 6/2011 | Ionita | ................. | G06K 9/00234 |
| | | | | | 382/118 |
| 2009/0080773 | A1* | 3/2009 | Shaw | ........................ | G06T 7/11 |
| | | | | | 382/173 |
| 2014/0044350 | A1* | 2/2014 | Ito | ........................ | G06K 9/4652 |
| | | | | | 382/164 |

(Continued)

FOREIGN PATENT DOCUMENTS

| CN | 101510299 A | 8/2009 |
| EP | 1944731 A3 | 2/2010 |
| WO | 2013100779 A1 | 7/2013 |

OTHER PUBLICATIONS

Chinese Patent Office Action for Chinese Patent Application 201380080597.9, dated Jul. 5, 2018, including English machine translation of search report (9 pages).

(Continued)

*Primary Examiner* — Sean Motsinger
(74) *Attorney, Agent, or Firm* — Barnes & Thornburg LLP (57) ABSTRACT

Technologies for multi-channel feature detection include a computing device to determine a filter response of each image channel of a multi-channel image for one or more image filters. The computing device determines a local differentiating color vector based on the filter responses, applies the filter responses to the local differentiating color vector to generate an adapted response, and determines a total response of the multi-channel image based on the adapted response.

25 Claims, 5 Drawing Sheets

(56) References Cited

U.S. PATENT DOCUMENTS

2014/0044351 A1* 2/2014 Ito .................... G06K 9/4652
382/165
2016/0253574 A1* 9/2016 Smirnov ............. G06K 9/4652
382/165

OTHER PUBLICATIONS

Li Zehui, "Moving target detection and tracking based on image sequence," Master's Thesis, dated Dec. 15, 2011.
Cao Jian, "Research of Image Target Recognition Technology Based on Local Features," Doctoral Thesis, dated Nov. 15, 2010.
Yang Tingting, "Research on Moving Target Detection and Tracking Algorithm in Video," dated Aug. 15, 2011.

* cited by examiner

TECHNOLOGIES FOR DETERMINING LOCAL DIFFERENTIATING COLOR FOR IMAGE FEATURE DETECTORS

CROSS-REFERENCE TO RELATED APPLICATION

The present application claims the benefit of U.S. patent application Ser. No. 14/361,212, filed May 28, 2014, which is a national stage entry under 35 U.S.C. 371(b) of International Application No. PCT/RU2013/001074, which was filed Nov. 28, 2013.

BACKGROUND

Computer vision utilizes a variety of image feature detectors to identify features of the image or "points of interest" within the image. Image features detectors may identify edges, corners, blobs (i.e., regions of interest points), and/or ridges of an analyzed image, depending on the particular algorithm/detector. For example, Canny algorithms and Sobel filters perform edge detection; Harris detectors perform corner detection; and Laplacian of Gausian (LoG), Hessian of Gaussian determinants, and Difference of Gaussian (DoG) detectors identify corners and blobs within an image. Feature detection systems oftentimes utilize a combination of algorithms and detectors to more accurately identify features of an analyzed image.

Common feature detectors, such as Speeded Up Robust Features (SURF), Scale-Invariant Feature Transform (SIFT), Canny, Harris, and Sobel detect and describe features of single-channel images (i.e., grayscale images). Accordingly, multi-channel images (i.e., colored images) must be transformed into a single-channel image as a preliminary analytical step to feature detection, which can result in significant loss of image information. For example, the image pixel values of the single-channel grayscale image may be generated as a linear combination of corresponding pixel values of each of the channels of the multi-channel image. As such, the contrast between multi-channel image pixels having distinct colors but the same single-channel grayscale representation is lost due to the grayscale transformation. Although some algorithms utilize perceptual-based color models (e.g., CSIFT uses Kubelka-Munk theory, which models the reflected spectrum of colored bodies), they use global color to grayscale mapping, which results in a loss of information.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
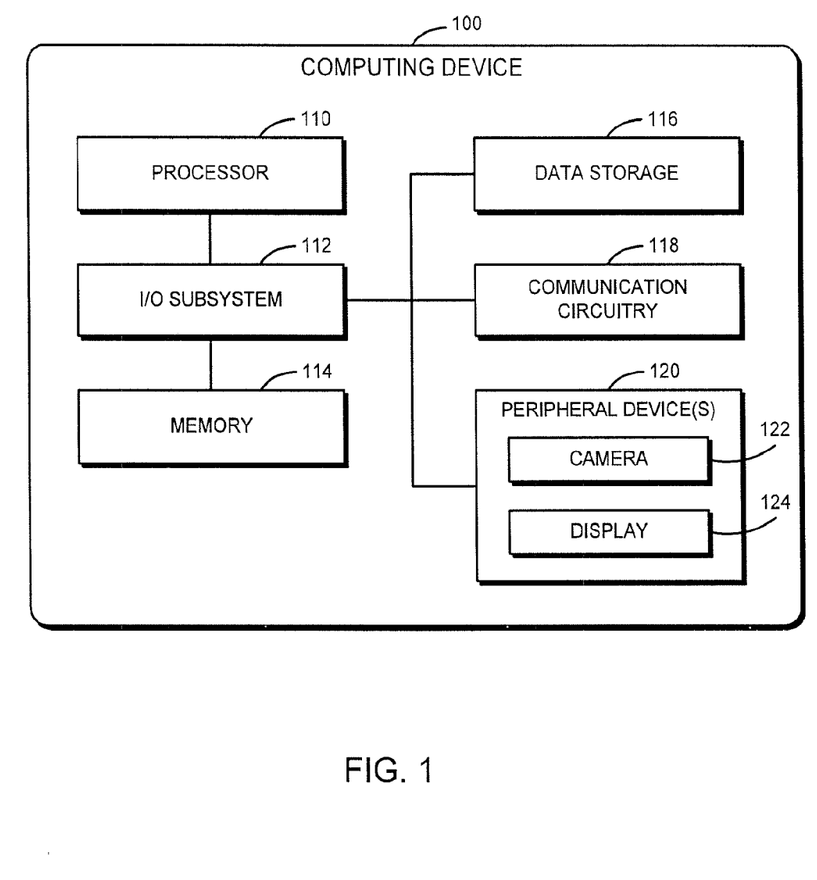
FIG. 1 is a simplified block diagram of at least one embodiment of a computing device for performing multi-channel feature detection.

Referring now to FIG. 1, a computing device 100 for multi-channel feature detection is configured to detect features (e.g., interest points such as corners, edges, blobs, etc.) of a multi-channel image. To do so, the computing device 100 utilizes information from multiple image channels in identifying image features rather than a single channel or grayscale image (e.g., a post-transform image). In the illustrative embodiment, the computing device 100 is configured to implement a low-complexity non-iterative algorithm for computing a local differentiating color (LDC) vector in which the response function of the inner kernel can be represented as a linear or quadratic form function. It should be appreciated that such a case covers a wide range of single-channel feature detectors that have inner kernels capable of being adapted for use with the LDC vector. For example, the second order spatial derivative filter responses $D_{xx}$, $D_{xy}$, $D_{yy}$ may be calculated, where x and y are spatial coordinates of the image. As such, the response of a LoG inner kernel may be expressed in a linear form, $(D_{xx}+D_{yy})$. The response of a SURF inner kernel may be expressed as a quadratic form, $$[D_{xx} \ D_{yy} \ D_{xy}] \begin{bmatrix} 0 & 1 & 0 \\ 0 & 0 & 0 \\ 0 & 0 & -1 \end{bmatrix} [D_{xx} \ D_{yy} \ D_{xy}]^T.$$

The response of an original Harris inner kernel may be expressed as a quadratic form, $$[D_{xx} \ D_{yy} \ D_{xy}] \begin{bmatrix} -k & 1-2k & 0 \\ 0 & -k & 0 \\ 0 & 0 & -1 \end{bmatrix} [D_{xx} \ D_{yy} \ D_{xy}]^T,$$

in which k is an algorithmic parameter. Additionally, a square response of a Canny inner kernel may be expressed as a quadratic form, $$[D_x \ D_y] \begin{bmatrix} 1 & 0 \\ 0 & 1 \end{bmatrix} [D_x \ D_y]^T,$$

where $D_x$ and $D_y$ are first order spatial derivative filter responses, again where x and y are spatial coordinates of the image.

The computing device 100 may be embodied as any type of computing device capable of multi-channel feature detection and performing the functions described herein. For example, the computing device 100 may be embodied as a cellular phone, smartphone, tablet computer, netbook, notebook, ultrabook™, laptop computer, personal digital assistant, mobile Internet device, desktop computer, Hybrid device, and/or any other computing/communication device. As shown in FIG. 1, the illustrative computing device 100 includes a processor 110, an input/output ("I/O") subsystem 112, a memory 114, a data storage 116, a communication circuitry 118, and one or more peripheral devices 120. Additionally, the peripheral devices 120 include a camera 122 and a display 124. Of course, the computing device 100 may include other or additional components, such as those commonly found in a typical computing device (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The communication circuitry 118 may be embodied as any communication circuit, device, or collection thereof, capable of enabling communications between the computing device 100 and other remote devices over a network (not shown). To do so, the communication circuitry 118 may use any suitable communication technology (e.g., wireless or wired communications) and associated protocol (e.g., Ethernet, Bluetooth®, Wi-Fi®, WiMAX, etc.) to effect such communication depending on, for example, the type of network, which may be embodied as any type of communication network capable of facilitating communication between the computing device 100 and remote devices.

The peripheral devices 120 of the computing device 100 may include any number of additional peripheral or interface devices. The particular devices included in the peripheral devices 120 may depend on, for example, the type and/or intended use of the computing device 100. As discussed above, the peripheral devices 120 include a camera 122 and a display 124. The camera 122 may be embodied as any peripheral or integrated device suitable for capturing images, such as a still camera, a video camera, a webcam, or other device capable of capturing video and/or images. The camera 122 may be used, for example, to capture multi-channel images in which features are detected. The display 124 of the computing device 100 may be embodied as any one or more display screens on which information may be displayed to a viewer of the computing device 100. The display 124 may be embodied as, or otherwise use, any suitable display technology including, for example, a liquid crystal display (LCD), a light emitting diode (LED) display, a cathode ray tube (CRT) display, a plasma display, and/or other display technology. The display 124 may be used, for example, to display an image indicative of the total response of an analyzed image. Although shown in FIG. 1 as integral to the computing device 100, it should be appreciated that the camera 122 and/or display 124 may be remote from the computing device 100 but communicatively coupled thereto in other embodiments.

Figure 2:
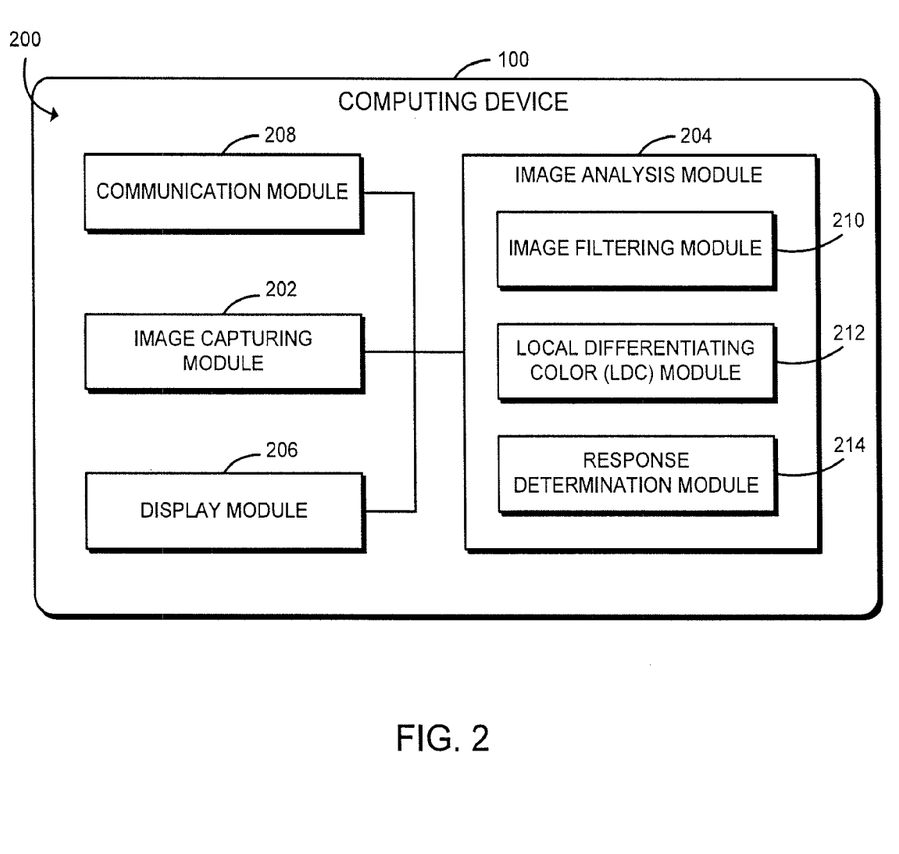
FIG. 2 is a simplified block diagram of at least one embodiment of an environment of the computing device of FIG. 1.

Referring now to FIG. 2, in use, the computing device 100 establishes an environment 200 for multi-channel feature detection. As discussed below, the computing device 100 determines a total image response of an analyzed multi-channel image based on a local differentiating color (LDC) vector and filter responses of the individual image channels of the multi-channel image. The illustrative environment 200 of the computing device 100 includes an image capturing module 202, an image analysis module 204, a display module 206, and a communication module 208. Additionally, the image analysis module 204 includes an image filtering module 210, a local differentiating color module 212, and a response determination module 214. Each of the image capturing module 202, the image analysis module 204, the display module 206, the communication module 208, the image filtering module 210, the local differentiating color module 212, and the response determination module 214 may be embodied as hardware, software, firmware, or a combination thereof. Additionally, in some embodiments, one of the illustrative modules may form a portion of another module.

The image capturing module 202 controls the camera 122 to capture images within the field of view of the camera 122 (e.g., for multi-channel feature detection). Depending on the particular embodiment, the images may be captured as streamed video or as individual images/frames. In other embodiments, the image capturing module 202 may otherwise retrieve a multi-channel image for analysis and feature detection. For example, the multi-channel image may be received from a remote computing device (e.g., in a cloud computing environment) with the communication module 208. It should be appreciated that the captured image may be embodied as any suitable multi-channel image. For example, the image may be a three-channel image such as an RGB (red-green-blue), HSL (hue-saturation-lightness), or HSV (hue-saturation-value) image. It should be further appreciated that the multi-channel image feature detection described herein may be applied to any type of image channels including channels for non-color spaces (e.g., RGB-D (depth), infrared, temperature map, microwave map, or other image channels).

The image analysis module 204 retrieves the images captured with the camera 122 from the image capturing module 202. In the illustrative embodiment, the image analysis module 204 establishes coordinates and parameters for image extended space points (e.g., for a scale-space representation and/or use with scale-space detectors). Further, as discussed in more detail below, the image analysis module 204 applies various filters to the analyzed image, determines an LDC vector for each image point (or a subset thereof) the image, and determines the total response of each image point of the image (or a subset thereof).

The image filtering module 210 determines a filter response (i.e., the result of applying an image filter to the image) of each image channel of the multi-channel image for one or more image filters. For example, the image filters may be applied to each pixel of the image in some embodiments. In doing so, it should be appreciated that the image filters may be applied using, for example, a "windowing" method in which the image filter is applied to a neighborhood (e.g., of the size of the image filter kernel) of the pixel. Although the image filters are generally applied to the individual pixels of an image channel, the image filters may be described herein as being applied to an image channel or other structure as a whole rather than the values of individual pixels for simplicity and clarity of the description. In an embodiment in which the multi-channel image includes three channels, the image filtering module 210 applies each image filter to each of the three channels to generate a corresponding filter response based on that filter. It should be appreciated that the filter responses for a particular image channel of the multi-channel image may be represented as a vector including the corresponding responses of the image channel to the one or more image filters. Additionally, such vectors may be referred to as "response vectors" or "vector responses" of the corresponding image channels. Further, in some embodiments, the particular image filters employed must be linear or quadratic form image filters. In other embodiments, the LDC vector may be applied to the pixels of the original image channels without any previous filtering or with only trivial/identity filters.

The local differentiating color module 212 determines a local differentiating color vector based on the filter responses determined by the image filtering module 210. As discussed in detail below, the local differentiating color vector is calculated or determined as a vector that defines weights for a linear combination of filter responses for the image channels and that produces an extreme (i.e., minimum or maximum depending on the particular embodiment) total response. For linear form, the local differentiating color module 212 determines the local differentiating color vector to be a vector that is collinear with a vector of total responses determined for each image channel For quadratic form, the local differentiating color vector is determined as an eigenvector (or normalized eigenvector) corresponding to an extreme eigenvalue of a specific generated symmetric matrix (i.e., the largest or smallest eigenvalue depending on the particular embodiment). As such, in the illustrative embodiment, the local differentiating color vector may be expressed in closed form rather than being calculated as a result of an optimization algorithm (e.g., minimizing or maximizing a cost function).

The response determination module 214 applies the local differentiating color vector to the image filter responses generated by the image filtering module 210 to generate an adapted response and determines a total response of the multi-channel image based on the adapted response. In the illustrative embodiment, the response determination module 214 applies the local differentiating color vector to the image filter responses by separately calculating the dot product of the local differentiating color vector and the response vector of each image channel of the multi-channel image. Additionally, as discussed in more detail below, the response determination module 214 determines the total response of the multi-channel image by generating a scalar value based on the adapted response and parameters of the particular filters and/or feature detection algorithms employed.

In the illustrative embodiment, the response determination module 214 also suppresses spatial non-extreme responses of the total response of the multi-channel image. That is, in some embodiments, the response determination module 214 removes non-interest points from the total response, which may be identified based on a pre-defined threshold value. In other words, interest points may be identified as image points having a local extreme response above or below the threshold value depending on the particular embodiment. As such, only interest points remain in the total response.

The display module 206 is configured to render images on the display 124 for the user of the computing device 100 to view. For example, the display module 206 may display one or more captured/received images (see FIG. 5) and/or images indicative of the total response of the images (see FIG. 6). Additionally, it should be appreciated that the display module 206 may render a visual depiction of the image at another stage of the feature detection process. For example, the display module 206 may render a graphical and/or textual depiction of the individual filter responses, the local differentiating color vector, the adapted response, and/or the total response prior to suppression of non-extreme responses.

The communication module 208 handles the communication between the computing device 100 and remote devices through a network. As discussed above, the communication module 208 may receive multi-channel images from a remote computing device for analysis (e.g., in a cloud computing environment or for offloaded execution). As such, in some embodiments, the communication module 208 may also transmit the result (e.g., the total response) of the feature detection analysis to a remote computing device.

Figure 3:
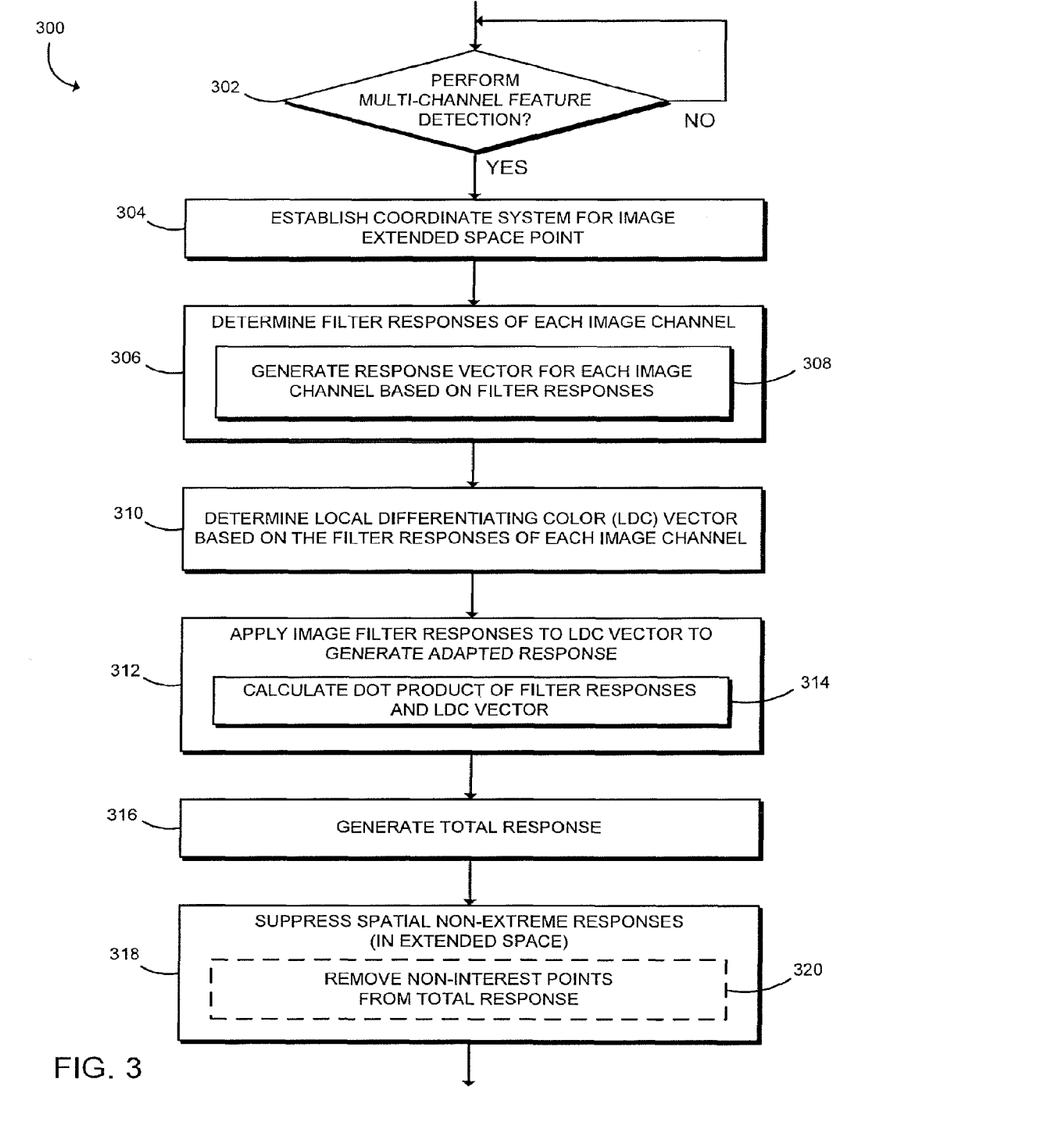
FIG. 3 is a simplified flow diagram of at least one embodiment of a method for performing multi-channel feature detection on the computing device of FIG. 1.

Referring now to FIG. 3, in use, the computing device 100 may execute a method 300 for performing multi-channel feature detection. The illustrative method 300 begins with block 302 of FIG. 3 in which the computing device 100 determines whether to perform multi-channel feature detection. If the computing device 100 determines to perform multi-channel feature detection, the computing device 100 establishes a coordinate system for image extended space points in block 304. In other words, the computing device 100 establishes, for example, a Cartesian coordinate system (e.g., commonly used x- and y-axes) and additional parameters (e.g., scale) for use with scale-space image feature detectors.

In block 306, the computing device 100 determines the filter responses of each image channel based on one or more image filters (e.g., Hessian determinant, Canny, Sobel filter, etc.). In doing so, in block 308, the computing device 100 generates a response vector for each image channel based on the filter responses as discussed above (i.e., by applying the image filters to the individual image channels). For example, suppose the analyzed multi-channel image is a three-channel RGB (red-green-blue) image and partial second derivatives of a Gaussian filter (i.e., components of the Hessian matrix) are employed as image filters. Accordingly, the image filters include $g_{xx}$, $g_{yy}$, and $g_{xy}$, which are partial second derivatives with respect to the corresponding image dimensions. In such an embodiment, each of the image filters (i.e., each of $g_{xx}$, $g_{yy}$, and $g_{xy}$) is applied to the red channel to generate a response vector for the red image channel As discussed above, the image filters may be applied to each pixel of the image. Accordingly, a response vector may be generated for each pixel of the image channel. Similarly, each of the image filters is applied to the blue image channel and to the green image channel such that a response vector is generated for each of the channels. Each response vector can be reduced to a scalar value. For example, the Hessian determinant can be determined by the quadratic form, $[g_{xx}\ g_{yy}\ g_{xy}]B[g_{xx}\ g_{yy}\ g_{xy}]^T$, where B is a predefined matrix and $g_{xx}$, $g_{xy}$, and $g_{yy}$, are second order partial derivatives of a Gaussian filter taken with respect to the corresponding spatial coordinates x and/or y. Of course, other embodiments may utilize a different number of image filters and/or analyze images having a different number of channels. As such, in a general case, suppose there are n channels and p filters. In such a case, the computing device 100 generates n response vectors (i.e., one for each channel) of size/length p (or, more specifically, size p×1) in which the elements are the filter responses of the image channel for the corresponding image filters.

Figure 4:
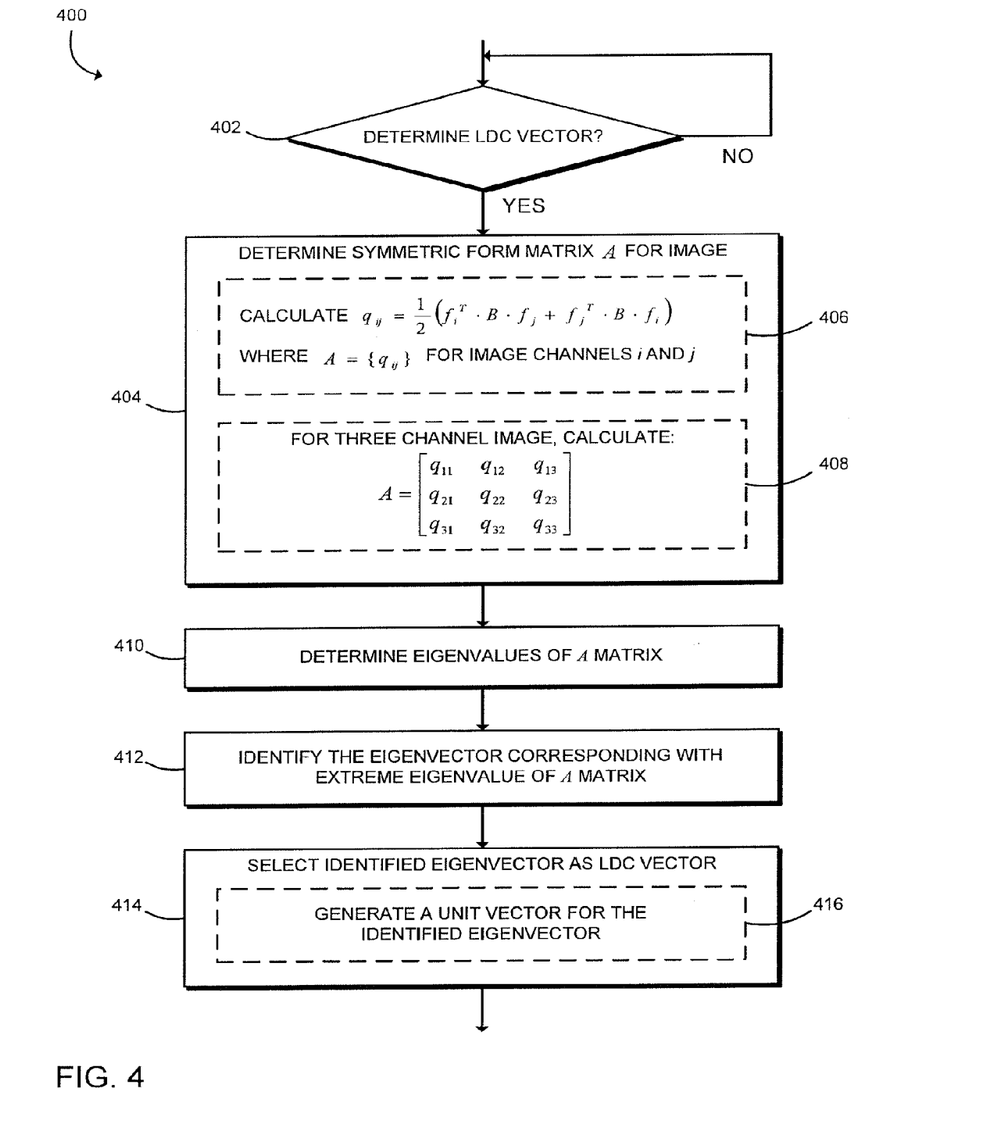
FIG. 4 is a simplified flow diagram of at least one embodiment of a method for determining a local differentiating color vector on the computing device of FIG. 1.

In block 310, the computing device 100 determines the local differentiating color vector based on the filter responses of each image channel (e.g., a normalized LDC vector). In other words, the computing device 100 utilizes the response vectors for the image channels to generate the local differentiating color vector. To do so, the computing device 100 may execute a method 400 for determining a local differentiating color vector as shown in FIG. 4. The illustrative method 400 begins with block 402 in which the computing device 100 determines whether to generate the local differentiating color vector. If so, the computing device 100 generates or otherwise determines a symmetric form matrix, A, for the image in block 404. It should be appreciated that the computing device 102 may generate a symmetric form of a quadratic form matrix using any suitable techniques, algorithms, and/or mechanisms. For example, in one embodiment, the computing device 100 may calculate each $$q_{ij} = \frac{1}{2}(f_i^T \cdot B \cdot f_j + f_j^T \cdot B \cdot f_i)$$

of the A matrix where $A=\{q_{ij}\}$ for the image channels i and j in block 406. In such an embodiment, $q_{ij}$ represents the element of the A matrix positioned at the $i^{th}$ row and $j^{th}$ column, f is a response vector for an image channel corresponding with an index of f, T is a transposition operator (i.e., $f^T$ is the transpose of f), and B is a predefined matrix based on the one or more image filters. For example, in the embodiment described above regarding the Hessian matrix, the B matrix may be defined as:

$$B = \begin{bmatrix} 0 & 1 & 0 \\ 0 & 0 & 0 \\ 0 & 0 & -1 \end{bmatrix}$$

and is known a priori. In another embodiment, the B matrix may be calculated based on image and/or filter parameters. In the illustrative embodiment, the computing device 100 calculates, in block 408, the matrix A for a three-channel image (e.g., an RGB image) as:

$$A = \begin{bmatrix} q_{11} & q_{12} & q_{13} \\ q_{21} & q_{22} & q_{23} \\ q_{31} & q_{32} & q_{33} \end{bmatrix}.$$

Of course, in other embodiments, the analyzed image may include fewer or greater number of channels and, in such embodiments, the matrix A is sized accordingly (e.g., a 4×4 matrix in embodiments in which the analyzed image includes four channels, etc.). In other words, the matrix A is embodied as an n×n matrix, where n is the number of image channels.

In block 410, the computing device 100 determines the eigenvalues of the A matrix. It should be appreciated that the computing device 100 may utilize any suitable techniques, algorithms, or mechanisms for doing so. For example, the computing device 100 may determine and utilize the characteristic equation of the A matrix in identifying its eigenvalues. In block 412, the computing device 100 identifies the eigenvector corresponding with an extreme eigenvalue of the A matrix (i.e., the largest or smallest eigenvalue depending on the particular embodiment) and, in block 414, the computing device 100 selects the identified eigenvector as the local differentiating color vector. In doing so, the computing device 100 may generate a unit vector for the identified eigenvector in block 416 in some embodiments. That is, the computing device 100 may normalize the eigenvector to generate a unit vector corresponding with the eigenvector, which may be selected as the local differentiating color vector.

Returning to FIG. 3, the computing device 100 applies the image filter responses to the generated/determined local differentiating color vector to generate a corresponding adapted response in block 312. In doing so, the computing device 100 calculates the dot product of the image filter responses and the local differentiating color vector in block 314 (e.g., to generate a single vector). For example, in the Hessian example described throughout, the dot product of the local differentiating color vector and a vector including the partial second derivatives is calculated for all channels of the image, which is equivalent with the transpose of the vector being multiplied by the local differentiating color vector. Specifically, $[g_{xx}\ g_{xy}\ g_{yy}]^T$ is multiplied by the local differentiating color vector for all channels of the image. In block 316, the computing device 100 generates a total response based on the adapted response. In the illustrative embodiment, the computing device 100 generates a scalar value based on the adapted response and the particular feature detection algorithms/filters used. For example, in an embodiment in which the Hessian matrix is used, the computing device 100 may utilize parameters and/or characteristics of the Hessian matrix to generate the total response (e.g., using the Hessian determinant). It should be appreciated that the computing device 100 may utilize any suitable techniques, algorithms, and/or mechanisms for doing so.

In block 318, the computing device 100 suppresses spatial non-extreme responses of the total response in extended space. That is, in block 320, the computing device 100 may remove non-interest points from the total response. As discussed above, interest points and non-interest points may be differentiated based on a pre-defined threshold value. For example, in one embodiment, the spatial image points of the total response having a local extreme response or an intensity value exceeding the pre-defined threshold value are considered to be "points of interest" or "interest points," whereas the spatial image points of the total response having local extreme responses or intensity values not exceeding the pre-defined threshold value are non-interest points. It should be appreciated that the computing device 100 may utilize any suitable feature detection algorithm having a quadratic form response function (e.g., SURF) and may identify "points of interest" in any suitable way. As indicated above, depending on the particular algorithm, points of interest may include corners, edges, blobs, and/or other images characteristics. Further, in some embodiments, the generation of the total response in block 316 includes the suppression of spatial non-extreme responses.

Figure 5:
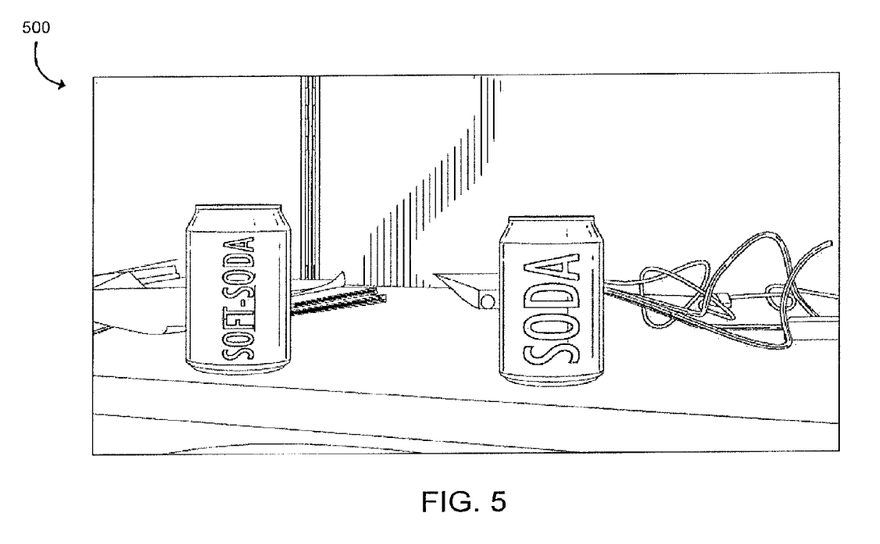
FIGS. 5 and 6 are diagrams of a captured image and its identified interest points, respectively, based on the method for multi-channel feature detection of FIG. 3 and a SURF feature detector as an inner kernel.
Figure 6:
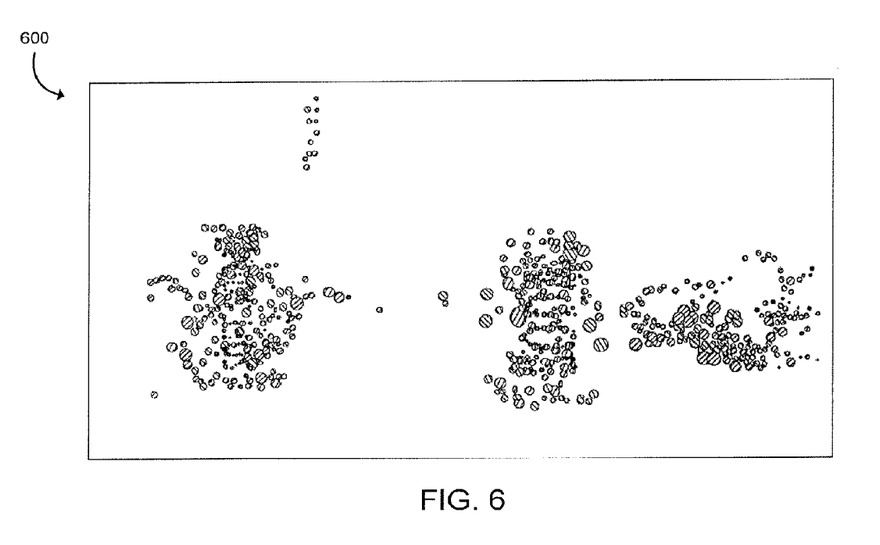

As discussed above, the computing device 100 may generate and display an image indicative of the total response of an analyzed multi-channel image for the user to view. For example, a simplified analyzed image 500 is shown in FIG. 5, and a simplified example output image 600, which is illustratively generated based on a multi-channel feature detection (with a SURF inner kernel) of the image 500, is shown in FIG. 6. In the simplified output image 600, the identified interest points/features are shown as differently shaded circles to connote circles of corresponding different colors. Of course, it should be appreciated that the image 600 is a simplified version of a real-world output image that would be generated using the technologies disclosed herein, and such real-world output image may identify points/features of interest using a greater or fewer number of circles having a larger range of different colors and sizes depending on, for example, the original analyzed image. Additionally, it should be appreciated that, unlike single-channel grayscale feature detection, the feature detection performed by the computing device 100 on an analyzed image to generate an output image as described herein does not suffer from the information loss inherent in a grayscale transformation.

EXAMPLES

Illustrative examples of the technologies disclosed herein are provided below. An embodiment of the technologies may include any one or more, and any combination of, the examples described below.

Example 1 includes a computing device for multi-channel feature detection, the computing device comprising an image filtering module to determine a filter response of each image channel of a multi-channel image for one or more image filters; a local differentiating color module to determine a local differentiating color vector based on the filter responses; and a response determination module to (i) apply the filter responses to the local differentiating color vector to generate an adapted response and (ii) determine a total response of the multi-channel image based on the adapted response.

Example 2 includes the subject matter of Example 1, and wherein the one or more filters consists of an identity filter.

Example 3 includes the subject matter of any of Examples 1 and 2, and wherein to determine the local differentiating color vector comprises to determine a vector that is collinear with a vector of total responses determined for each image channel based on the filter response of each image channel.

Example 4 includes the subject matter of any of Examples 1-3, and wherein to determine the local differentiating color vector comprises to determine a symmetric form matrix for the multi-channel image; and identify an eigenvector corresponding with a smallest-valued eigenvalue or largest-valued eigenvalue of the symmetric form matrix.

Example 5 includes the subject matter of any of Examples 1-4, and wherein to determine the local differentiating color vector comprises to determine a symmetric form of a quadratic form matrix for the multi-channel image; and identify an eigenvector corresponding with a smallest-valued eigenvalue or a largest-valued eigenvalue of the quadratic form matrix.

Example 6 includes the subject matter of any of Examples 1-5, and wherein to determine the quadratic form matrix comprises to calculate a matrix $A=\{q_{ij}\}$ for image channels i and j, where $$q_{ij} = \frac{1}{2}(f_i^T \cdot B \cdot f_j + f_j^T \cdot B \cdot f_i),$$

and wherein $q_{ij}$ is the element of the matrix A at the $i^{th}$ row and $j^{th}$ column, f is a response vector for an image channel corresponding with an index of f based on the filter response of the image channel, T is a transposition operator, and B is a predefined matrix based on the one or more image filters.

Example 7 includes the subject matter of any of Examples 1-6, and wherein to determine the local differentiating color vector comprises to normalize the identified eigenvector to generate the local differentiating color vector.

Example 8 includes the subject matter of any of Examples 1-7, and wherein to determine the filter response of each image channel of the multi-channel image comprises to determine a filter response of each image channel of a multi-channel image for each pixel of the multi-channel image.

Example 9 includes the subject matter of any of Examples 1-8, and wherein to determine the filter response of each image channel of the multi-channel image comprises to generate a response vector for each image channel based on the filter response of each image channel.

Example 10 includes the subject matter of any of Examples 1-9, and wherein to apply the filter responses to the local differentiating color vector comprises to calculate a dot product of the local differentiating color vector and the filter responses.

Example 11 includes the subject matter of any of Examples 1-10, and wherein to determine the local differentiating color vector comprises to determine a normalized local differentiating color vector based on the filter responses.

Example 12 includes the subject matter of any of Examples 1-11, and wherein the response determination module is further to suppress spatial non-extreme responses of the total response of the multi-channel image.

Example 13 includes the subject matter of any of Examples 1-12, and wherein to suppress the spatial non-extreme responses comprises to remove non-interest points from the total response of the multi-channel image, wherein the non-interest points are identified based on a pre-defined threshold value.

Example 14 includes the subject matter of any of Examples 1-13, and further including a display module to display an image indicative of the total response on a display of the computing device.

Example 15 includes the subject matter of any of Examples 1-14, and further including an image capturing module to capture a captured image with a camera of the computing device, wherein the multi-channel image is the captured image.

Example 16 includes the subject matter of any of Examples 1-15, and wherein the one or more image filters comprise one or more of a first order derivative image filter or a second order derivative image filter.

Example 17 includes a method for performing multi-channel feature detection on a computing device, the method comprising determining, by the computing device, a filter response of each image channel of a multi-channel image for one or more image filters; determining, by the computing device, a local differentiating color vector based on the filter responses; applying, by the computing device, the filter responses to the local differentiating color vector to generate an adapted response; and determining, by the computing device, a total response of the multi-channel image based on the adapted response.

Example 18 includes the subject matter of Example 17, and wherein the one or more filters consists of an identity filter.

Example 19 includes the subject matter of any of Examples 17 and 18, and wherein determining the local differentiating color vector comprises determining a vector that is collinear with a vector of total responses determined for each image channel based on the filter response of each image channel.

Example 20 includes the subject matter of any of Examples 17-19, and wherein determining the local differentiating color vector comprises determining a symmetric form matrix for the multi-channel image; and identifying an eigenvector corresponding with a smallest-valued eigenvalue or largest-valued eigenvalue of the symmetric form matrix.

Example 21 includes the subject matter of any of Examples 17-20, and wherein determining the local differentiating color vector comprises determining a symmetric form of a quadratic form matrix for the multi-channel image; and identifying an eigenvector corresponding with a smallest-valued eigenvalue or a largest-valued eigenvalue of the quadratic form matrix.

Example 22 includes the subject matter of any of Examples 17-21, and wherein determining the quadratic form matrix comprises calculating a matrix $A=\{q_{ij}\}$ for image channels i and j, where $$q_{ij} = \frac{1}{2}(f_i^T \cdot B \cdot f_j + f_j^T \cdot B \cdot f_i),$$

and wherein $q_{ij}$ is the element of the matrix A at the $i^{th}$ row and $j^{th}$ column, f is a response vector for an image channel corresponding with an index of f based on the filter response of the image channel, T is a transposition operator, and B is a predefined matrix based on the one or more image filters.

Example 23 includes the subject matter of any of Examples 17-22, and wherein determining the local differentiating color vector comprises normalizing the identified eigenvector to generate the local differentiating color vector.

Example 24 includes the subject matter of any of Examples 17-23, and wherein determining the filter response of each image channel of the multi-channel image comprises determining a filter response of each image channel of a multi-channel image for each pixel of the multi-channel image.

Example 25 includes the subject matter of any of Examples 17-24, and wherein determining the filter response of each image channel of the multi-channel image comprises generating a response vector for each image channel based on the filter response of each image channel Example 26 includes the subject matter of any of Examples 17-25, and wherein applying the filter responses to the local differentiating color vector comprises calculating a dot product of the local differentiating color vector and the filter responses.

Example 27 includes the subject matter of any of Examples 17-26, and wherein determining the local differentiating color vector comprises determining a normalized local differentiating color vector based on the filter responses.

Example 28 includes the subject matter of any of Examples 17-27, and further including suppressing, by the computing device, spatial non-extreme responses of the total response of the multi-channel image.

Example 29 includes the subject matter of any of Examples 17-28, and wherein suppressing the spatial non-extreme responses comprises removing non-interest points from the total response of the multi-channel image, wherein the non-interest points are identified based on a pre-defined threshold value.

Example 30 includes the subject matter of any of Examples 17-29, and further including displaying, on a display of the computing device, an image indicative of the total response.

Example 31 includes the subject matter of any of Examples 17-30, and further including capturing, by a camera of the computing device, a captured image, wherein the multi-channel image is the captured image.

Example 32 includes the subject matter of any of Examples 17-31, and wherein the one or more image filters comprise one or more of a first order derivative image filter or a second order derivative image filter.

Example 33 includes a computing device comprising a processor; and a memory having stored therein a plurality of instructions that when executed by the processor cause the computing device to perform the method of any of Examples 17-32.

Example 34 includes one or more machine-readable storage media comprising a plurality of instructions stored thereon that, in response to being executed, result in a computing device performing the method of any of Examples 17-32.

Example 35 includes a computing device for multi-channel feature detection, the computing device comprising means for determining a filter response of each image channel of a multi-channel image for one or more image filters; means for determining a local differentiating color vector based on the filter responses; means for applying the filter responses to the local differentiating color vector to generate an adapted response; and means for determining a total response of the multi-channel image based on the adapted response.

Example 36 includes the subject matter of Example 35, and wherein the one or more filters consists of an identity filter.

Example 37 includes the subject matter of any of Examples 35 and 36, and wherein the means for determining the local differentiating color vector comprises means for determining a vector that is collinear with a vector of total responses determined for each image channel based on the filter response of each image channel.

Example 38 includes the subject matter of any of Examples 35-37, and wherein the means for determining the local differentiating color vector comprises means for determining a symmetric form matrix for the multi-channel image; and means for identifying an eigenvector corresponding with a smallest-valued eigenvalue or largest-valued eigenvalue of the symmetric form matrix.

Example 39 includes the subject matter of any of Examples 35-38, and wherein the means for determining the local differentiating color vector comprises means for determining a symmetric form of a quadratic form matrix for the multi-channel image; and means for identifying an eigenvector corresponding with a smallest-valued eigenvalue or a largest-valued eigenvalue of the quadratic form matrix.

Example 40 includes the subject matter of any of Examples 35-39, and wherein the means for determining the quadratic form matrix comprises means for calculating a matrix $A=\{q_{ij}\}$ for image channels i and j, where $$q_{ij} = \frac{1}{2}(f_i^T \cdot B \cdot f_j + f_j^T \cdot B \cdot f_i),$$

and wherein $q_{ij}$ is the element of the matrix A at the $i^{th}$ row and $j^{th}$ column, f is a response vector for an image channel corresponding with an index of f based on the filter response of the image channel, T is a transposition operator, and B is a predefined matrix based on the one or more image filters.

Example 41 includes the subject matter of any of Examples 35-40, and wherein the means for determining the local differentiating color vector comprises means for normalizing the identified eigenvector to generate the local differentiating color vector.

Example 42 includes the subject matter of any of Examples 35-41, and wherein the means for determining the filter response of each image channel of the multi-channel image comprises means for determining a filter response of each image channel of a multi-channel image for each pixel of the multi-channel image.

Example 43 includes the subject matter of any of Examples 35-42, and wherein the means for determining the filter response of each image channel of the multi-channel image comprises means for generating a response vector for each image channel based on the filter response of each image channel.

Example 44 includes the subject matter of any of Examples 35-43, and wherein the means for applying the filter responses to the local differentiating color vector comprises means for calculating a dot product of the local differentiating color vector and the filter responses.

Example 45 includes the subject matter of any of Examples 35-44, and wherein the means for determining the local differentiating color vector comprises means for determining a normalized local differentiating color vector based on the filter responses.

Example 46 includes the subject matter of any of Examples 35-45, and further including means for suppressing spatial non-extreme responses of the total response of the multi-channel image.

Example 47 includes the subject matter of any of Examples 35-46, and wherein the means for suppressing the spatial non-extreme responses comprises means for removing non-interest points from the total response of the multi-channel image, wherein the non-interest points are identified based on a pre-defined threshold value.

Example 48 includes the subject matter of any of Examples 35-47, and further including means for displaying, on a display of the computing device, an image indicative of the total response.

Example 49 includes the subject matter of any of Examples 35-48, and further including means for capturing, by a camera of the computing device, a captured image, wherein the multi-channel image is the captured image.

Example 50 includes the subject matter of any of Examples 35-49, and wherein the one or more image filters comprise one or more of a first order derivative image filter or a second order derivative image filter.

Example 51 includes a computing device for multi-channel feature detection, the computing device comprising a local differentiating color module to determine a local differentiating color vector based on pixel values of each image channel of a multi-channel image; and a response determination module to (i) apply the pixel values of each image channel to the local differentiating color vector to generate an adapted response and (ii) determine a total response of the multi-channel image based on the adapted response.

Example 52 includes the subject matter of Example 51, and wherein to determine the local differentiating color vector comprises to determine a vector that is collinear with a vector of total responses determined for each image channel based on the pixel values of each image channel.

Example 53 includes the subject matter of any of Example 51 and 52, and wherein to determine the local differentiating color vector comprises to determine a symmetric form matrix for the multi-channel image; and identify an eigenvector corresponding with a smallest-valued eigenvalue or largest-valued eigenvalue of the symmetric form matrix.

Example 54 includes the subject matter of any of Example 51-53, and wherein to determine the local differentiating color vector comprises to normalize the identified eigenvector to generate the local differentiating color vector.

Example 55 includes the subject matter of any of Example 51-54, and wherein the response determination module is further to suppress spatial non-extreme responses of the total response of the multi-channel image.

Example 56 includes a method for performing multi-channel feature detection on a computing device, the method comprising determining, by the computing device, a local differentiating color vector based on pixel values of each image channel of a multi-channel image; applying, by the computing device, the pixel values of each image channel to the local differentiating color vector to generate an adapted response; and determining, by the computing device, a total response of the multi-channel image based on the adapted response.

Example 57 the subject matter of Example 56, and wherein determining the local differentiating color vector comprises determining a vector that is collinear with a vector of total responses determined for each image channel based on the pixel values of each image channel.

Example 58 the subject matter of any of Examples 56 and 57, and wherein determining the local differentiating color vector comprises determining a symmetric form matrix for the multi-channel image; and identifying an eigenvector corresponding with a smallest-valued eigenvalue or largest-valued eigenvalue of the symmetric form matrix.

Example 59 the subject matter of any of Examples 56-58, and wherein determining the local differentiating color vector comprises normalizing the identified eigenvector to generate the local differentiating color vector.

Example 60 the subject matter of any of Examples 56-59, and further including suppressing, by the computing device, spatial non-extreme responses of the total response of the multi-channel image.

Example 61 includes a computing device comprising a processor; and a memory having stored therein a plurality of instructions that when executed by the processor cause the computing device to perform the method of any of Examples 56-60.

Example 62 includes one or more machine-readable storage media comprising a plurality of instructions stored thereon that, in response to being executed, result in a computing device performing the method of any of Examples 56-60.

Example 63 includes a computing device for multi-channel feature detection, the computing device comprising means for performing the method of any of Examples 56-60.

The invention claimed is:

1. A computing device for multi-channel feature detection, the computing device comprising:
   an image filtering module to:
      acquire a multi-channel image;
      determine a filter response of each image channel of the multi-channel image for one or more image filters;
   a local differentiating color module to determine a local differentiating color vector based on the filter responses; and
   a response determination module to:
      apply the filter responses to the local differentiating color vector to generate an adapted response;
      determine a total response of the multi-channel image based on the adapted response; and
      identify one or more interest points in the multi-channel image based on the total response.

2. The computing device of claim 1, wherein to determine the local differentiating color vector comprises to determine a vector that is collinear with a vector of total responses determined for each image channel based on the filter response of each image channel.

3. The computing device of claim 1, wherein to determine the local differentiating color vector comprises to:
   determine a symmetric form of a quadratic form matrix for the multi-channel image; and
   identify an eigenvector corresponding with a smallest-valued eigenvalue or a largest-valued eigenvalue of the quadratic form matrix.

4. The computing device of claim 3, wherein to determine the quadratic form matrix comprises to calculate a matrix $A=\{q_{ij}\}$ for image channels i and j, where $$q_{ij} = \frac{1}{2}(f_i^T \cdot B \cdot f_j + f_j^T \cdot B \cdot f_i),$$

and
   wherein $q_{ij}$ is the element of the matrix A at the $i^{th}$ row and $j^{th}$ column, f is a response vector for an image channel corresponding with an index of f based on the filter response of the image channel, T is a transposition operator, and B is a predefined matrix based on the one or more image filters.

5. The computing device of claim 3, wherein to determine the local differentiating color vector comprises to normalize the identified eigenvector to generate the local differentiating color vector.

6. The computing device of claim 1, wherein to determine the filter response of each image channel of the multi-channel image comprises to determine a filter response of each image channel of a multi-channel image for each pixel of the multi-channel image.

7. The computing device of claim 1, wherein to determine the filter response of each image channel of the multi-channel image comprises to generate a response vector for each image channel based on the filter response of each image channel.

8. The computing device of claim 7, wherein to apply the filter responses to the local differentiating color vector comprises to calculate a dot product of the local differentiating color vector and the filter responses.

9. The computing device of claim 1, wherein to determine the local differentiating color vector comprises to determine a normalized local differentiating color vector based on the filter responses.

10. The computing device of claim 1, wherein the response determination module is further to suppress spatial non-extreme responses of the total response of the multi-channel image.

11. The computing device of claim 10, wherein to suppress the spatial non-extreme responses comprises to remove non-interest points from the total response of the multi-channel image, wherein the non-interest points are identified based on a pre-defined threshold value.

12. The computing device of claim 1, further comprising a display module to display an image indicative of the total response on a display of the computing device.

13. The computing device of claim 1, wherein the one or more image filters comprise one or more of a first order derivative image filter or a second order derivative image filter.

14. One or more non-transitory, machine-readable storage media comprising a plurality of instructions stored thereon that, in response to execution by a computing device, cause the computing device to:
- acquire a multi-channel image;
- determine a filter response of each image channel of the multi-channel image for one or more image filters;
- determine a local differentiating color vector based on the filter responses;
- apply the filter responses to the local differentiating color vector to generate an adapted response;
- determine a total response of the multi-channel image based on the adapted response; and
- identify one or more interest points in the multi-channel image based on the total response.

15. The one or more non-transitory, machine-readable storage media of claim 14, wherein to determine the local differentiating color vector comprises to determine a vector that is collinear with a vector of total responses determined for each image channel based on the filter response of each image channel.

16. The one or more non-transitory, machine-readable storage media of claim 14, wherein to determine the local differentiating color vector comprises to:
- determine a symmetric form matrix for the multi-channel image; and
- identify an eigenvector corresponding with a smallest-valued eigenvalue or largest-valued eigenvalue of the symmetric form matrix.

17. The one or more non-transitory, machine-readable storage media of claim 14, wherein to determine the local differentiating color vector comprises to:
- determine a symmetric form of a quadratic form matrix for the multi-channel image; and
- identify an eigenvector corresponding with a smallest-valued eigenvalue or a largest-valued eigenvalue of the quadratic form matrix.

18. The one or more non-transitory, machine-readable storage media of claim 17, wherein to determine the quadratic form matrix comprises to calculate a matrix $A=\{q_{ij}\}$ for image channels i and j, where $$q_{ij} = \frac{1}{2}(f_i^T \cdot B \cdot f_j + f_j^T \cdot B \cdot f_i),$$

and
- wherein $q_{ij}$ is the element of the matrix A at the $i^{th}$ row and $j^{th}$ column, f is a response vector for an image channel corresponding with an index of f based on the filter response of the image channel, T is a transposition operator, and B is a predefined matrix based on the one or more image filters.

19. The one or more non-transitory, machine-readable storage media of claim 17, wherein to determine the local differentiating color vector comprises to normalize the identified eigenvector to generate the local differentiating color vector.

20. The one or more non-transitory, machine-readable storage media of claim 14, wherein to determine the filter response of each image channel of the multi-channel image comprises to determine a filter response of each image channel of a multi-channel image for each pixel of the multi-channel image.

21. The one or more non-transitory, machine-readable storage media of claim 14, wherein to apply the filter responses to the local differentiating color vector comprises to calculate a dot product of the local differentiating color vector and the filter responses.

22. The one or more non-transitory, machine-readable storage media of claim 14, wherein the plurality of instructions further causes the computing device to suppress spatial non-extreme responses of the total response of the multi-channel image.

23. A computing device for multi-channel feature detection, the computing device comprising:
- an image analysis module to acquire a multi-channel image;
- a local differentiating color module to determine a local differentiating color vector based on pixel values of each image channel of the multi-channel image; and
- a response determination module to:
- apply the pixel values of each image channel to the local differentiating color vector to generate an adapted response;
- determine a total response of the multi-channel image based on the adapted response; and
- identify one or more interest points in the multi-channel image based on the total response.

24. The computing device of claim 23, wherein to determine the local differentiating color vector comprises to determine a vector that is collinear with a vector of total responses determined for each image channel based on the pixel values of each image channel.

25. The computing device of claim 23, wherein to determine the local differentiating color vector comprises to (i) determine a symmetric form matrix for the multi-channel image and (ii) identify an eigenvector corresponding with a smallest-valued eigenvalue or largest-valued eigenvalue of the symmetric form matrix, and
- wherein the response determination module is further to suppress spatial non-extreme responses of the total response of the multi-channel image.

* * * * *